Figure 1:
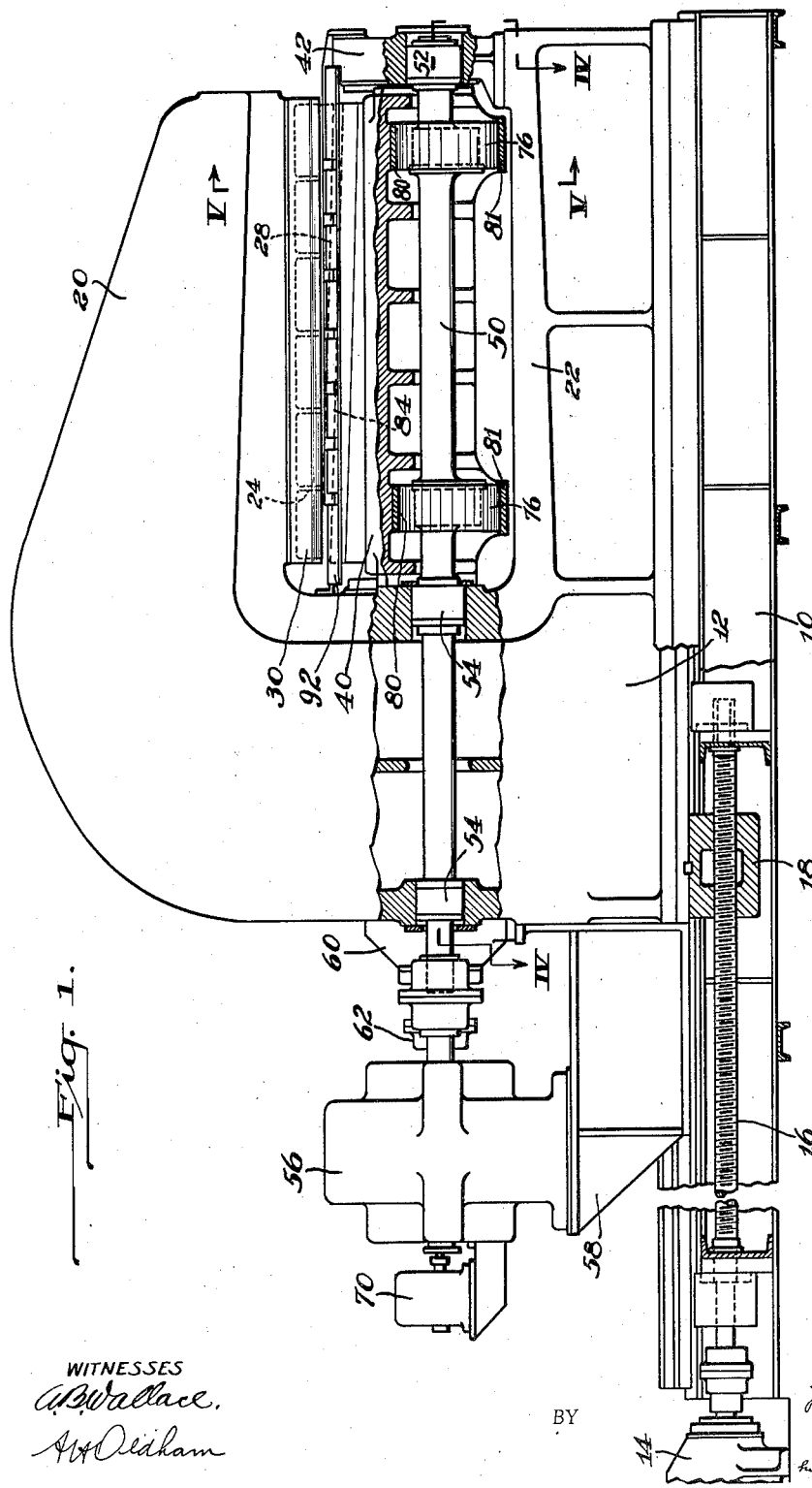

March 8, 1938. F. B. STREINE 2,110,777
UP-CUT OPEN-THROAT SHEAR
Filed May 9, 1936 3 Sheets-Sheet 1

WITNESSES
A. B. Wallace.
A. H. Oldham.

INVENTOR.
Frank B. Streine
BY Brown, Critchlow & Flick
his ATTORNEYS.

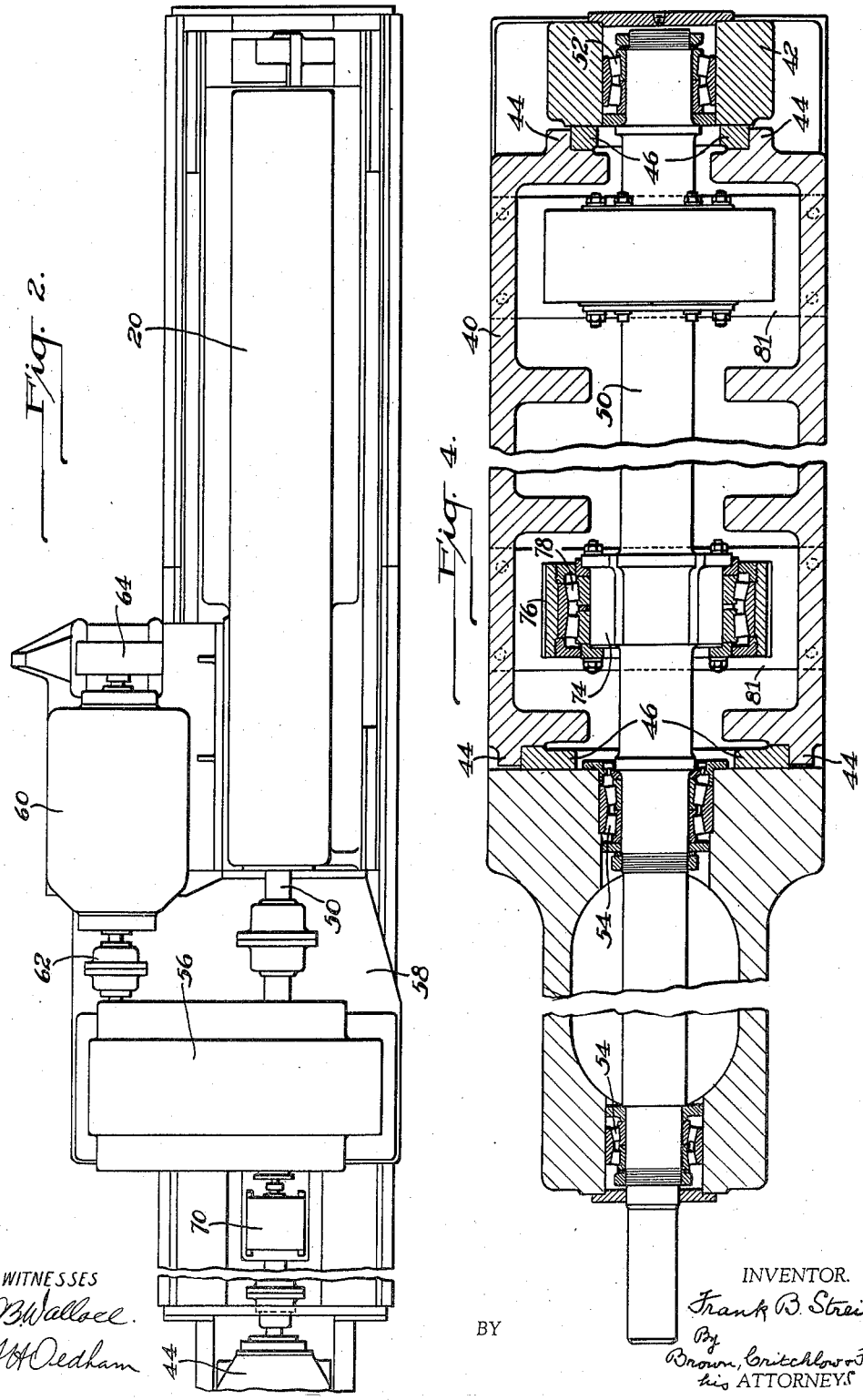

March 8, 1938.  F. B. STREINE  2,110,777
UP-CUT OPEN-THROAT SHEAR
Filed May 9, 1936  3 Sheets-Sheet 3
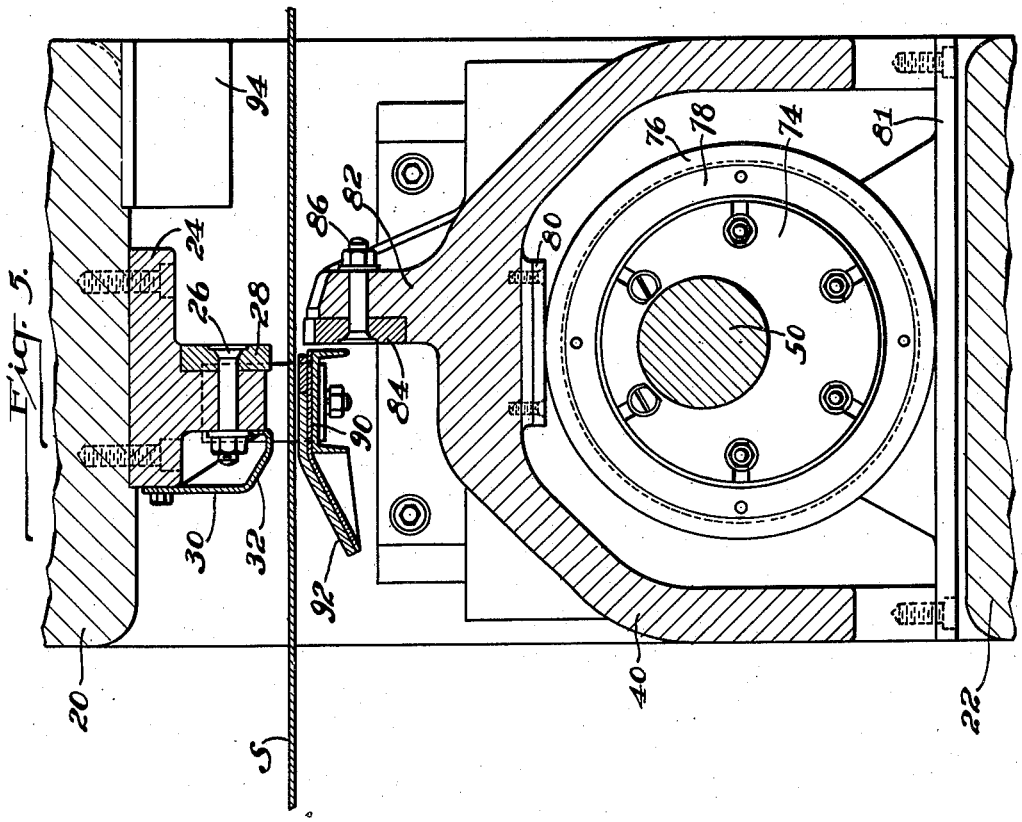
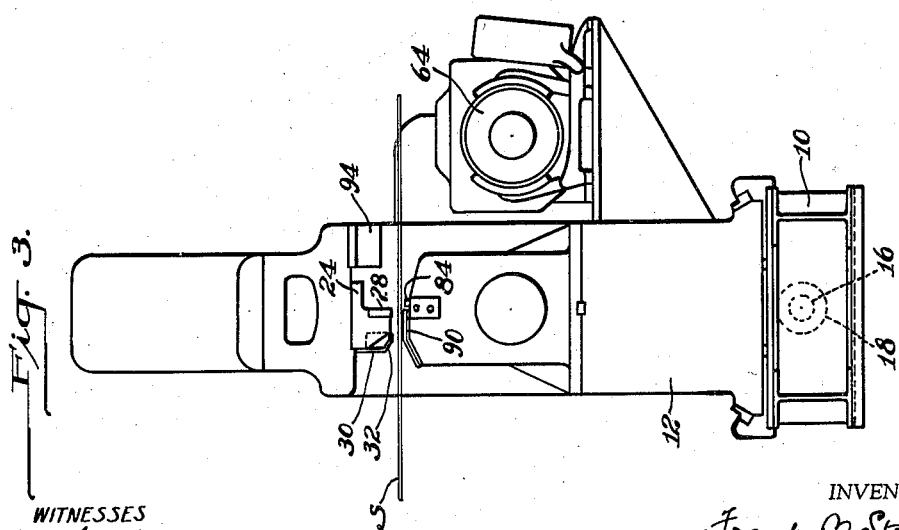
INVENTOR.
Frank B. Streine
BY Brown, Critchlow & Flick
his ATTORNEYS.
WITNESSES
A.B.Wallace.
A.H.Oldham.

Patented Mar. 8, 1938

2,110,777

UNITED STATES PATENT OFFICE 2,110,777

UP-CUT OPEN-THROAT SHEAR

Frank B. Streine, Pittsburgh, Pa., assignor to United Engineering & Foundry Company, Pittsburgh, Pa., a corporation of Pennsylvania Application May 9, 1936, Serial No. 78,816

4 Claims. (Cl. 164—66)

This invention relates to shears for cutting sheet metal and the like and more particularly to semi-automatic shears for transversely cutting metal strip.

Heretofore in shears for cutting strip and similar metal both up-cut and down-cut blades operated by eccentrics have been employed. However, due to the relatively large forces necessary to effect the desired shearing operations severe wear of the working parts has been encountered, as well as loss of power to overcome frictional resistance. Likewise in many of the known types of shears the structures have a large number of working parts adding to initial and maintenance costs. Furthermore, simple means for handling the metal before and after cutting, for rendering the shearing operation automatic, and for mounting the entire shear assembly for movement to an inoperative station, are lacking in shears now employed.

It is the object of my invention to avoid and overcome the foregoing and other difficulties and deficiencies of shears for cutting sheet metal by the provision of a relatively simple, rugged, and easily operated shear of this type wherein the shearing cut is an upcut and is effected by a minimum number of substantially frictionless parts including eccentrics operating in a new and novel manner.

Another object of the invention is to provide the combination of a shear and means for handling the metal before and after the cutting operation.

Another object of my invention is the provision of means for mounting the whole shear assembly for movement to and from an operative position.

Another object of my invention is to provide automatic or semi-automatic control for a sheet metal shear.

The foregoing and other objects of the invention, as will be evident as the description proceeds, are achieved by the provision of an up-cut shear including a base, a C-frame slidably mounted on the base and having an upper and a lower arm with means for moving the C-frame along the base from an operative to an inoperative position. An upper blade is secured to the upper arm of the C-frame and a cooperating lower blade is carried by a saddle having an inverted U-shape in cross section and mounted for vertically slidable movement in the lower arm. A shaft extending through the saddle and journaled in the frame carries a plurality of circular discs eccentrically mounted thereon with frictionless bearings mounting a ring on the periphery of each eccentric. The rings engage with flat surfaces on the saddle so that rotary movement of the shaft moves the lower blade to and from cutting relation with the upper blade.

The shaft is rotated by a motor mounted on the frame and operating through a gear box. Incorporated in the drive are cam-controlled limit switches for automatically stopping the motor after the desired shearing operation. Means are likewise associated with the apparatus for supporting the metal before and after shearing.

In the accompanying drawings Fig. 1 is a side elevation, partly broken away, of one embodiment of my invention; Fig. 2 is a plan view of the apparatus of Fig. 1; Fig. 3 is an end elevation from the open end of the shear of the apparatus of Figs. 1 and 2; Fig. 4 is a horizontal cross-sectional view taken on line IV—IV of Fig. 1; and Fig. 5 is a transverse vertical cross-sectional view taken on line V—V of Fig. 1.

My invention is broadly applicable to shears for cutting sheet material of many kinds and for cutting bars, sections, rods and the like of metal. However, it is particularly adapted to shears for cutting strip and sheet metal and accordingly has been so illustrated and will be so described.

Having reference to the drawings the numeral 10 indicates a base, generally equal to about twice the length of a C-frame 12 slidably mounted thereon. The position of the frame on the base may be controlled by the provision of a motor 14 connected to a screw 16 having threaded engagement with a nut block 18 secured to the underside of the frame. By these means the C-frame 12 and its associated mechanism can be moved from an operative to an inoperative position, as for example, to a position above or away from a conveyor carrying the metal strip to be sheared.

The C-frame 12 forms an open throat defined by an upper arm 20 and a lower arm 22. Secured to the upper arm 20 is a blade carrying bracket 24 to which is removably secured, as by bolts 26, an upper shear blade 28. Generally I contemplate covering the bracket 24 and bolts 26 with a guide plate 30 at the metal entering side of the shear which plate is appropriately shaped, as at 32, to function as a guide to direct the metal to be cut between the shear blades and prevent it catching on the bolts or bracket.

The lower arm 22 of the C-frame 12 carries a saddle 40, of inverted U-shape in cross section, for vertical reciprocating movement. To this end a post 42 is secured at the end of the throat opening to thereby define a pocket in which the saddle is received. The ends of the saddle are formed with vertically directed ribs 44 which cooperate with vertically extending gibs 46 secured to the post 42 and the base of the throat of the C-frame, as best seen in Fig. 4.

Extending through the saddle 40 is a shaft 50 which is journaled at one end in a frictionless bearing 52 carried by the post 42 and at its other end in a pair of frictionless bearings 54 mounted in the C-frame. The frictionless bearings are of the sealed self-lubricating type. The shaft 50 is connected to a reduction gear box 56 carried on a bracket 58 secured to the C-frame 12. Likewise carried on a portion of the bracket 58 is a motor 60 which is connected by a shaft 62, running parallel with the shaft 50, to the gear box 56.

Associated with the motor 60 is an automatic brake 64 of known type adapted to almost immediately stop the motor when the current is shut off. A motor control mechanism is incorporated in the combination and this comprises a cam type limit switch 70 connected to an extension of shaft 50 in the gear box 56. Since switches of this type per se are well known to those skilled in the electrical art it will not be described in detail. Suffice it to say that the cams are usually adjusted to operate a limit switch to shut off the motor 60 after each shear cut has been made and the parts are returned to a position ready for the next cut. The motor 60 is started when desired to make the next cut by a push button controlled by the shear operator.

Eccentrically mounted upon the shaft 50 adjacent the ends of the saddle 40 are circular discs 74 each of which carries rotatable rims or rings 76 on frictionless bearings 78. The saddle 40 is provided with flat surfaces upon which the rims 76 engage and roll during rotation of the shaft 50 and in the form of my invention illustrated the flat surfaces may comprise plates 80 and 81 secured respectively to the saddle above and below the rims. The plates 80 and 81 and rims 76 are preferably hardened to better resist wear under the severe stresses to which they are subjected and ordinarily the clearance between the plates is slightly greater than the diameter of the rims 76 so that free rolling movement thereof on either upper plates 80 or lower plates 81 is assured, depending of course upon whether the saddle is being positively moved up or down. Often the weight of the saddle provides for downward movement and the plates 81 come into contact with the rims only when the weight is insufficient to overcome any resistance to downward movement of the saddle.

The upper side of the saddle 40 is formed with a flange 82 to which a lower shear blade 84 is removably secured as by bolts 86 so that the blade 84 is in cutting relation with upper blade 28. The blades are in substantially horizontal position but have their cutting edges formed with a rake or bevel so that they form an acute angle of approximately five degrees between themselves.

Means are provided for holding the sheet metal, marked S and shown in Fig. 5, before and after cutting and these means preferably comprise a platform 90 secured at its ends to the post 42 and the C-frame 12 so as to be positioned just below the upper knife holding bracket 24. The platform 90 is formed with a downwardly inclined edge 92 which cooperates with the guide plate 30 to facilitate the introduction of the sheet metal between the shear blades. The platform 90 holds the metal before shearing and one end of the metal after shearing unless it is a crop end. To hold the other end of the metal after shearing, one or more magnets 94 are secured to the upper arm 20 of the C-frame, as shown in Fig. 5, and can be controlled by the shear operator to hold the metal when desired.

It is believed that the operation of the apparatus will be evident from the foregoing description; however, briefly, the operation comprises positioning the C-frame 12 at one end of the base 10 to bring the shear blades over the metal strip S to be cut. The operator then starts motor 60 to rotate shaft 50 which turns the eccentrically mounted discs 74 to move the saddle 40 upwardly and effect a shearing action between blades 84 and 28. The eccentric discs 74 rotate within the rims 76 which engage with the plates 80 and 81 carried by the saddle so that the only movement between the rims 76 and the plates 80 and 81 is a slight rocking or rolling movement. This feature, together with the frictionless bearings 78 between the rims and the discs, and the frictionless bearings on the shaft 50 provides a very smoothly operating shear having low power losses and little or no wear on its parts.

In the usual operation of the apparatus, once the motor 60 is started the shear effects one cut and returns to a position ready for a second cut at which time the cam limit switch 70 cuts off the current to motor 60 which is immediately stopped by brake 64. Pushing of the motor starting button causes a repetition of the cycle.

After the first shearing operation, for example for the purpose of cutting off the crop end of a metal strip, the magnets 94 may be energized to hold the main portion of the strip away from the shears. The crop end of a second strip can now be sheared off and the ends of the two strips are left in alignment for a stitched or welded connection. If such an operation follows a single or double shearing operation the C-frame 12 and its associated parts can be moved entirely away from the strip or the conveyor carrying the strip by operation of the motor 14. For subsequent shearing operations the C-frame is readily moved back to operative position in the same manner.

From the foregoing it will be recognized that the objects of the invention have been attained by the provision of a relatively simple and rugged up-cut shear which operates in a substantially frictionless fashion whereby initial operating and maintenance costs are noticeably reduced over known equipment. The shear is adapted to handle sheet metal before and after shearing and includes automatic motor control mechanism which greatly simplifies operation. The apparatus is adapted to be moved bodily to and from shearing position whereby welding, stitching and like procedures after shearing are greatly simplified.

While in accordance with the patent statutes one embodiment of my invention has been illustrated and described in detail, it should be understood that the invention is not limited thereto or thereby, but is defined in the appended claims.

I claim:

1. A shear for transversely cutting metal strip comprising relatively movable blades, means for relatively moving the blades toward and from each other, and means for moving both blades laterally away from the normal path of travel of the strip in the direction of the line of cut.

2. A shear for cutting metal strip and the like comprising a frame, relatively movable cooperating blades mounted in the frame, means for reciprocating the blades to and from cutting relation with each other, means mounting the frame for movement to and from a position in operating relation with the strip, and means for moving the frame.

3. An up-cut open-throat shear comprising a frame, an upper blade secured to the upper portion of the frame, a saddle having an inverted U-shape in cross section mounted for vertically slidable movement in the lower portion of the frame, a lower blade carried on the upper portion of the saddle and cooperating with the upper blade, and means extending through the saddle and journaled in the frame for moving the saddle and the lower blade to and from cutting cooperation with the upper blade.

4. A shear for cutting metal strip or the like comprising a frame, relatively movable blades in the frame, a U-shaped saddle mounting one of the blades slidably in the frame, and means received within and protected by the saddle for effecting relative movement between the blades.

FRANK B. STREINE.